United States Patent
Silva et al.

(10) Patent No.: US 8,889,010 B2
(45) Date of Patent: Nov. 18, 2014

(54) NORM REMOVAL FROM FRAC WATER

(75) Inventors: James Manio Silva, Clifton Park, NY (US); Hope Matis, Schenectady, NY (US); William Leonard Kostedt, IV, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 720 days.

(21) Appl. No.: 13/189,864

(22) Filed: Jul. 25, 2011

(65) Prior Publication Data
US 2012/0097614 A1    Apr. 26, 2012

Related U.S. Application Data

(60) Provisional application No. 61/405,806, filed on Oct. 22, 2010.

(51) Int. Cl.
*B01D 15/00* (2006.01)
*C02F 9/00* (2006.01)
*B01J 39/00* (2006.01)
*B01J 45/00* (2006.01)
*C02F 101/20* (2006.01)
*C02F 101/00* (2006.01)
*C02F 1/42* (2006.01)
*C02F 1/52* (2006.01)
*C02F 1/66* (2006.01)
*C02F 1/68* (2006.01)
*C02F 1/74* (2006.01)
*C02F 1/04* (2006.01)

(52) U.S. Cl.
CPC .............. *C02F 9/00* (2013.01); *C02F 2101/206* (2013.01); *C02F 2101/006* (2013.01); *C02F 1/42* (2013.01); *C02F 2101/203* (2013.01); *B01J 39/00* (2013.01); *C02F 2001/5218* (2013.01); *C02F 1/66* (2013.01); *B01J 45/00* (2013.01); *C02F 1/683* (2013.01); *C02F 1/74* (2013.01); *C02F 1/048* (2013.01)
USPC ........... 210/660; 210/669; 210/682; 210/722; 210/714; 210/715; 210/723; 210/737

(58) Field of Classification Search
USPC ......... 210/660, 669, 682, 722, 714–715, 723, 210/737
See application file for complete search history.

(56) References Cited

U.S. PATENT DOCUMENTS 2,554,649 A * 5/1951 Tompkins ................... 534/10
(Continued)

FOREIGN PATENT DOCUMENTS

WO    WO0213202 A1    2/2002

OTHER PUBLICATIONS

Search Report and Written Opinion from corresponding EP Application No. 11177830.4-2104 dated Jan. 25, 2012.
Deng, "Polymeric Adsorbent for Radium Removal from Groundwater", Adsorption, vol. 11, No. 1, pp. 805-809, Jul. 1, 2005.

(Continued)

*Primary Examiner* — Chester Barry
(74) *Attorney, Agent, or Firm* — Mary Louise Stanford

(57) ABSTRACT

A method for treating low barium frac water includes contacting a frac water stream with a radium selective complexing resin to produce a low radium stream, passing the low radium stream through a thermal brine concentrator to produce a concentrated brine; and passing the concentrated brine through a thermal crystallizer to yield road salt.

12 Claims, 1 Drawing Sheet

(56) References Cited

U.S. PATENT DOCUMENTS

| | | | |
|---|---|---|---|
| 5,196,124 | A | 3/1993 | Connor et al. |
| 5,640,701 | A | 6/1997 | Grant et al. |
| 5,728,302 | A * | 3/1998 | Connor et al. ............ 210/679 |
| 5,787,332 | A | 7/1998 | Black et al. |
| 6,365,051 | B1 | 4/2002 | Bader |
| 2009/0159532 | A1 | 6/2009 | Kelly et al. |

OTHER PUBLICATIONS

Singh et al., "Oil and gas: Produced water treatment for beneficial uses", Filtration and Separation, vol. 47, No. 1, pp. 20-23, Jan. 1, 2010.

Snoeyink et al., "Removal of Barium and Radium From Groundwater", EPA Environmental Research Brief, Research and Development, EPA/600/M-86/021, pp. 1-8, Feb. 1987.

* cited by examiner

NORM REMOVAL FROM FRAC WATER

CROSS-REFERENCE TO RELATED APPLICATIONS

This application is a non-provisional of and claims priority from U.S. provisional application Ser. No. 61/405,806, filed 22 Oct. 2010, the entire disclosure of which is incorporated herein by reference.

STATEMENT REGARDING FEDERALLY SPONSORED RESEARCH AND DEVELOPMENT

This invention was made with Government support under Subcontract 01822-36 to Research Partnership to Secure Energy for America (RPSEA), a contractor to the United States Department of Energy under prime contract DE-AC26-07NT42677. The Government has certain rights in the invention.

BACKGROUND

The contribution to the US energy supply from unconventional gas sources is growing dramatically. Shale gas production in the US has increased from 0.3 TCF in 1996 to 1.1 TCF in 2006, accounting for 6% of the nation's supply.

Water is used extensively in shale gas production. A typical well consumes 4-5 million gallons of water during the drilling and hydrofracturing processes. Typically this water is trucked in from remote locations. In addition, gas after the hydrofracturing process, much of this water is returned the surface as a brine solution termed "frac flowback water", which is followed by "produced water". Both flowback and produced water will be referred to as "frac" water. Because the frac water has very high salinity (50,000-200,000 ppm TDS), it cannot be disposed of in surface waters. Frac water is frequently disposed of in salt-water disposal wells, which are deep injection wells in salt formations. A significant problem with many of the shale gas plays, including the Marcellus Shale, is that there are few available deep well injection sites wells and environmental regulations prohibit discharge to rivers and other surface waters. In other shale gas plays, such as the Barnett Shale in Texas, water availability is limited and the use of large quantities of water for gas production generates much resistance from the public. Therefore, technology that enables cost-effective water reuse in shale gas production is essential for sustained development of this resource.

In current water management models for shale gas operations using hydraulic fracturing, fresh water is injected to form cracks in the formation and deliver proppant to maintain permeability. In addition to proppant, a number of chemicals are added to the water to reduce friction, minimize corrosion and scale, prevent bacterial growth, and reduce drilling mud damage. About 20-50% of the water used to hydrofracture a well is returned as flowback, usually within a 2-3 weeks of injection. This water contains high amounts of dissolved solids (TDS ~50,000-200,000 ppm for the Marcellus shales), in addition to many of the injected additives. It is stored in suitable containment tanks before being transported to appropriate disposal facilities. Historically, off-site disposal has been the more favorable wastewater treatment option. This is because the relatively small scale of water production and short time frame associated with drilling make capital investment in stationary local treatment options impractical. In recent years, there have been efforts to develop economically viable on-site treatment and recycling using mobile water treatment facilities.

The process of drilling and preparing a natural gas well in a gas shale formation typically requires 4-5 million gallons of fresh water per well. The cost to treat and dispose of this water is a significant expense to the gas producers. Brine disposal usually entails shipping the wastewater to an old well for reinjection. Treatment of the water on or adjacent to the well site would eliminate the cost of shipping millions of gallons of wastewater to a treatment facility and/or disposal site, and obviate the need to truck in additional millions of gallons of fresh water.

In the presence of sulfate ion, a solution of $RaCl_2$ and $BaCl_2$ coprecipitates as $RaSO_4$ and $BaSO_4$ even when the concentrations of $Ra^{++}$ and $SO_4^=$ are far below the solubility of $RaSO_4$ in water. Radium and barium coprecipitate to form a solid solution of $RaSO_4$—$BaSO_4$. Under ideal solid solution conditions, the calculated solubility of $RaSO_4$ in equilibrium with a solid solution of $RaSO_4$—$BaSO_4$ is $8.2\times10^{-12}$ M, or $1.8\times10^{-6}$ ppm Ra. This solubility of Ra is equivalent to 1800 pCi/L of $^{226}$Ra. The presence of NaCl enhances the coprecipitation of Ra with $BaSO_4$.

The sulfate treatment method generates a $BaSO_4/RaSO_4$ sludge. This sludge may be combined with lime treatment sludge. The sludge stream must be dried, and then hauled to a landfill. The cost for sludge disposal as nonhazardous waste in a RCRA-D landfill is typically about $50/ton. However, to qualify for disposal as nonhazardous waste, the sludge must have an activity below a value of 5 to 50 pCi/gm (varies by state). The maximum activity for nonhazardous waste disposal in Pennsylvania is 25 pCi/gm. Sludge that exceeds this value needs to be disposed of as low-level radioactive waste (LLRW), which is discussed below. If the radium activity exceeds about 400 pCi/L, the sludge will need to be either blended with sufficient non-radioactive solid waste to meet the RCRA-D specification or treated as low-level radioactive waste (LLRW). The cost of LLRW disposal is too high for a sulfate precipitation process to be used for frac water from many, if not most, sites.

Radium selective complexing (RSC) resins are a strong acid gelular cation exchange resins that have been completely exchanged with barium followed by sulfuric acid treatment to make finely dispersed, bound $BaSO_4$ microcrystallites. These bound $BaSO_4$ crystallites ion exchange with radium as shown below.

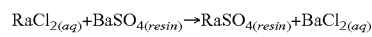

$$RaCl_{2(aq)} + BaSO_{4(resin)} \rightarrow RaSO_{4(resin)} + BaCl_{2(aq)}$$

RSC resin is often utilized to remove radium from brine that is used to regenerate softening ion exchange resins in municipal water systems. For example, in a demonstration study (Mangelson, K. A. and Lauch, R. P., Removing and Disposing of Radium from Well Water, Journal of the American Water Works Association, 82 (6), 72-76 (1990)), hardness ($Mg^{++}$, $Ca^{++}$, $Sr^{++}$, $Ba^{++}$) and radium were removed from drinking water using a conventional gelular sulfonic acid ion exchange resin (sodium form). The softening ion exchange resin was regenerated with NaCl brine (average 40,600 ppm TDS) to remove hardness and radium. The regeneration brine leaving the ion exchange resin contained an average of 1180 pCi/liter radium. Prior to disposal, this regeneration brine was treated with RSC resin. The RSC resin removed an average of 99.2% of the radium from the softener regeneration brine. After one year of operation, the resin loading was 3,000 pCi/cc resin.

However, the results of some studies have indicated that RSC resins are not suitable for use with water containing the very high levels of total dissolved solids that are typically found in frac water. See, for example, Snoeyink, et al. (1987

Environmental Research Brief, Removal of Barium and Radium from Groundwater, February 1987), and references cited therein.

Therefore, there remains a need for cost effective methods to treat frac waters before reusing or recycling.

BRIEF DESCRIPTION

Briefly, in one aspect, the present invention relates to methods for treating low barium frac water, typically containing less than about 1000 ppm barium. The methods include contacting a frac water stream with a radium selective complexing resin to produce a low radium stream, passing the low radium stream through a thermal brine concentrator to produce a concentrated brine; and passing the concentrated brine through a thermal crystallizer.

DRAWINGS

DETAILED DESCRIPTION

Figure 1:
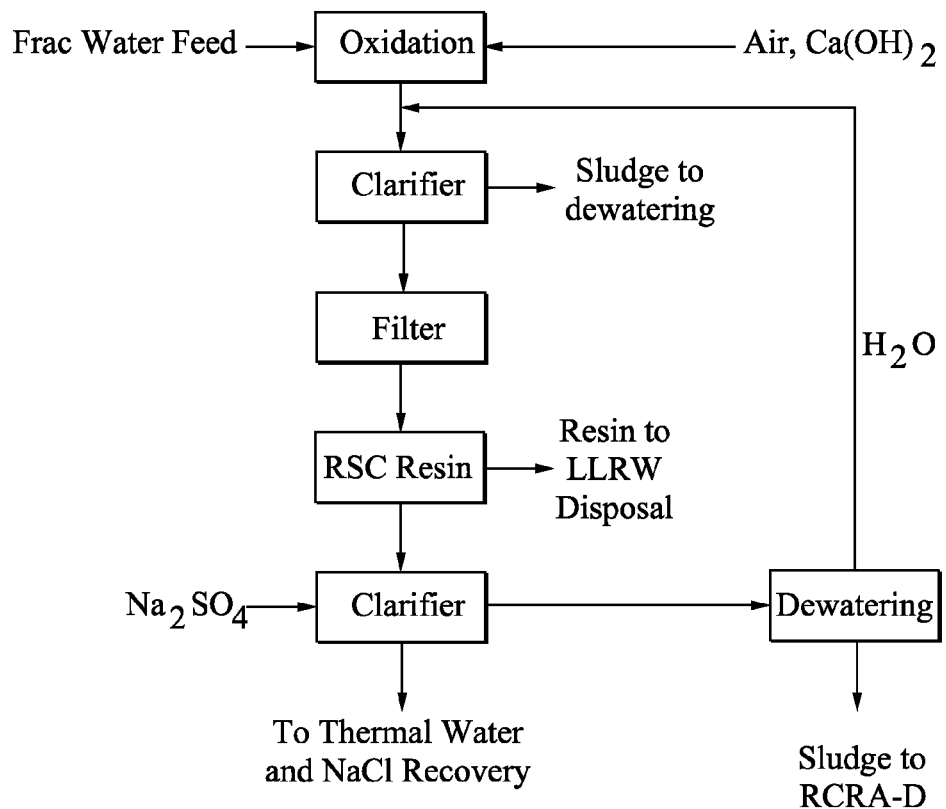
FIG. 1 shows a frac water pretreatment process for use in the methods of the present invention.

FIG. 1 shows a frac water pretreatment process for use in the methods of the present invention. In the context of the present invention, the term 'low barium' means that the frac water contains less than about 2,000 ppm barium; in some embodiments, less than about 1,000 ppm barium, and less than 100 ppm barium in still other embodiments. If higher levels of barium are present, capacity of the resin for radium may be reduced.

In the first step, raw frac water that contains iron and manganese is treated with lime and air to oxidize $Fe^{+2}$ and $Mn^{+2}$ to $Fe^{+3}$ and $Mn^{+4}$, respectively. In the second step, iron and manganese, as well as suspended solids, are precipitated in a clarifier. If iron or manganese is present, the oxidation and precipitation steps may be omitted if the RSC resin is not fouled in subsequent steps. Iron and manganese are well-known foulants for many types of ion exchange resins, and iron has been cited as a key foulant for RSC resins.

The sludge from the lime treatment step is sent to a sludge thickener for dewatering. Sludge resulting from lime treatment typically does not contain a significant level of radioactivity.

The clarified frac water stream may be filtered before it is passed through the RSC resin. Filtration may be omitted if desired or unnecessary.

The frac water brine is then contacted with a RSC resin to remove radium. RSC resin is available from Dow Chemical Company as DOWEX™ RSC cation exchange resin. In the next step, the brine may be treated with sodium sulfate in a clarifier to coprecipitate $BaSO_4$ and any residual $RaSO_4$. Because the bulk of the radium is removed from the frac water brine prior to sulfate treatment, the radium level in the sulfate sludge is typically acceptable for disposal in a RCRA-D landfill for non-hazardous waste. The sulfate sludge may be dewatered in a thickener and filter press. Water from the dewatering process may be recycled to the front of the process. The pretreated frac water brine may then be safely reused as NORM-free source water blendstock for hydrofracturing, or may be further purified as illustrated in FIG. 2.

Figure 2:
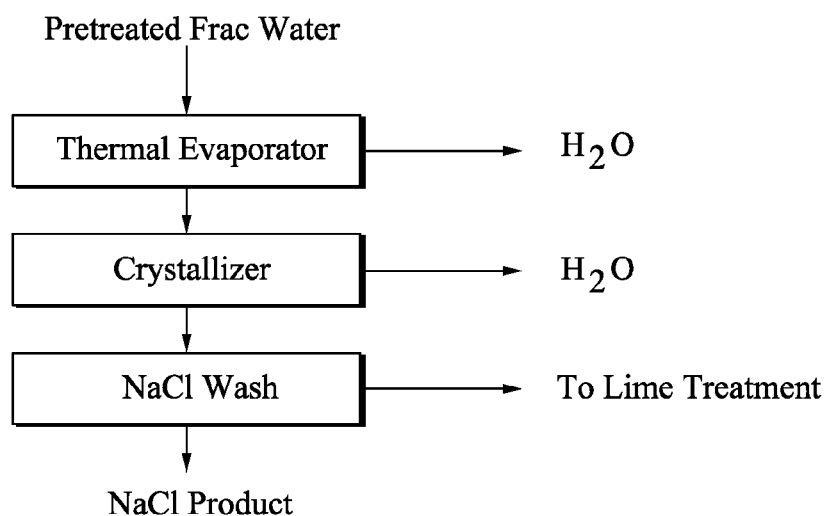
FIG. 2 is a flow diagram of a thermal water and salt recovery process for the pretreated frac water.

FIG. 2 shows a block flow diagram of a thermal water and salt recovery process for pretreated frac water according to methods of the present invention.

In the first step, the pretreated frac water brine is passed through a thermal evaporator or an equivalent, such as a brine concentrator to preconcentrate the brine. Brine concentration technology is well established and one of skill in art would be able to configure and operate a system for use with frac water brine without difficulty. For example, vertical-tube, falling-film evaporators may be used in this step, such as the RCC® Brine Concentrator, available from GE Water & Process Technologies. This is a type of falling film evaporator for treating waters saturated with scaling constituents such as calcium sulfate or silica.

In the next step, the preconcentrated brine is passed through a salt crystallizer to recover distilled water and salable NaCl. Any crystallizer for use with concentrated brine may be used. RCC® Crystallizer systems from GE Water & Process Technologies are particularly suitable, and mechanical vapor recompression (MVR) technology to recycle the steam vapor, minimizing energy consumption and costs.

In a final, optional, step, the salt produced in the crystallizer may be washed to yield a material that may be sold for use as road salt. Even without a wash step, in some cases, the dry crystalline NaCl product may meet government standards for use as road salt, being free of toxic substances as determined by Toxicity Characteristic Leaching Procedure (TCLP) analysis and conforming to the ASTM D-635 standard for road salt. The wash water may be subjected to lime treatment to produce a sludge that may be dried prior to disposal as non-hazardous waste.

EXAMPLES

Screening Study of RSC Resin for Frac Water Treatment

Composition of frac water samples is shown in Table 1.

TABLE 1

| Frac Water Composition (mg/L except where noted) | | | |
|---|---|---|---|
|  | E-1 | Spike-1 | Spike-2 |
| TDS | 67,400 | 67,400 | 67,400 |
| $Na^+$ | 19,200 | 19,200 | 19,200 |
| $Mg^{++}$ | 560 | 560 | 560 |
| $Ca^{++}$ | 5,360 | 5,360 | 5,360 |
| $Sr^{++}$ | 1,290 | 1,290 | 1,290 |
| $Ba^{++}$ | 32 | 1032 | 11,632 |
| $Fe^{++}$ | 55 | 55 | 55 |
| $Mn^{++}$ | 2 | 2 | 2 |
| $Cl^-$ | 12,500 | 12,500 | 12,500 |
| $SO_4^-$ | <10 | <10 | <10 |
| $^{226}Ra$ pCi/liter | 4,596 | 4,596 | 4,596 |

The sample "E-1" comprises frac water from a well in western Pennsylvania. This water was sampled on the 14th day after flowback water began to flow from a well that had been hydrofractured. Samples Spike-1 and Spike-2 are the same as E-1 except that Spike-1 was spiked with 1000 ppm Ba and Spike-2 was spiked with 11,600 ppm Ba (both as $BaCl_2$). All experiments were conducted at room temperature (22° C.).

Example 1

Samples of 18 gm brine (E-1) were mixed with various amounts of DOWEX RSC resin to establish a radium adsorption isotherm. Brine and resin were added to centrifuge tubes and placed on a rotary laboratory mixer for 24 hours at 10 rpm. The samples were then decanted and measured for radioactivity by liquid scintillation counting.

Radium has many short-lived daughter products (e.g. radon gas, polonium, lead, and bismuth). These daughter products are not ion exchanged onto RSC resin. When the daughter products decompose, they register along with radium in the liquid scintillation counter. Therefore, with RSC treatment, it is not possible to reduce the liquid scintillation count measurement down to the background level. Instead, we have found that the counts reach a plateau as the proportion of RSC resin to brine increases. We take the plateau count level as being indicative of substantially radium-free brine. We then estimate the total activity based on an assumed counting efficiency of 90% and a 2 mL volume of sample being counted.

$$\text{Activity}(pCi/L) = \left(\frac{x - \text{blank count/min}}{60 \text{ sec/min}}\right)\left(\frac{27 \ pCi}{decomp/\text{sec}}\right)\left(\frac{decomp/\text{sec}}{0.9 \text{ count/sec}}\right)\left(\frac{1000 \text{ mL/L}}{2 \text{ mL}}\right)$$

where x=counts per minute for a sample, as measured by liquid scintillation counting, LSC.

The "Removable Activity in Solution" (RAS) is the difference between the measured activity and the lowest measured activity. For example 1, the lowest measured activity occurs for Sample E-1-5. The estimated concentration of radium on the resin is calculated as follows.

$$\text{Activity on Resin}(pCi/gm \text{ resin}) =$$

$$\left(\frac{RAS(\text{no resin}) - RAS(\text{with resin})pCi/L \text{ brine}}{gm \text{ resin}}\right)\left(\frac{mL \text{ brine}}{1000 \text{ mL brine/L brine}}\right)$$

Based on this measurement approach, we estimated the resin isotherm as shown in Table 2. This shows that the resin has approximately 640 pCi/gm radium capacity for the brine composition E-1.

TABLE 2

Liquid Scintillation Counting Results: Brine E-1

|  | Resin (g) | Brine (g) | Count/min | Sample-Blank Count/min | Total Activity (pCi/L) | Removable Activity in solution (pCi/L) | Conc on Resin (pCi/g) |
|---|---|---|---|---|---|---|---|
| Blank |  |  | 32.4 | 0 |  |  |  |
| E-1-1 | 0 | 17.985 | 65.07 | 32.67 | 8176 | 4329 |  |
| E-1-2 | 0.05 | 18.071 | 57.58 | 25.18 | 6301 | 2455 | 639 |
| E-1-3 | 0.101 | 18.06 | 49.85 | 17.45 | 4367 | 521 | 643 |
| E-1-4 | 0.151 | 17.97 | 49.67 | 17.27 | 4322 | 475 | 433 |
| E-1-5 | 0.199 | 19.073 | 47.77 | 15.37 | 3846 | 0 | 391 |
| E-1-6 | 0.301 | 18.019 | 48.92 | 16.52 | 4134 | 288 | 228 |
| E-1-7 | 0.397 | 18.123 | 49.77 | 17.37 | 4347 | 501 | 165 |
| E-1-8 | 0.601 | 18.098 | 48.37 | 15.97 | 3996 | 150 | 119 |
| E-1-9 | 1.207 | 18.258 | 48.17 | 15.77 | 3946 | 100 | 60 |
| E-1-10 | 0.203 | 17.968 | 49.18 | 16.78 | 4199 | 353 | 332 |

Example 2

E-1 brine was spiked with 1000 ppm Ba (as BaCl$_2$) and the isotherm was measured as shown in Table 3.

TABLE 3

Liquid Scintillation Counting Results: Brine Spike-1

| Sample | Resin (g) | Brine (g) | Count/min | Sample-Blank Count/min | Total Activity (pCi/L) | Removable Activity in solution (pCi/L) | Conc on Resin (pCi/g) |
|---|---|---|---|---|---|---|---|
| Blank |  |  | 32.15 | 0 |  |  |  |
| Spike-1-1 | 0 | 18 | 50.38 | 18.23 | 9124 | 5277 |  |
| Spike-1-2 | 0.091 | 18.2398 | 49.07 | 16.92 | 8468 | 4622 | 113 |
| Spike-1-3 | 0.198 | 17.93 | 48.4 | 16.25 | 8133 | 4286 | 77 |
| Spike-1-4 | 0.3973 | 17.89 | 46.75 | 14.6 | 7307 | 3460 | 71 |
| Spike-1-5 | 0.6207 | 18.08 | 46.8 | 14.65 | 7332 | 3485 | 45 |
| Spike-1-6 | 0.7874 | 17.989 | 45.12 | 12.97 | 6491 | 2645 | 52 |
| Spike-1-7 | 0.2523 | 17.86 | 50.65 | 18.5 | 9259 | 5412 | −8 |

This example shows that the resin capacity for radium decreased significantly to about 110 pCi/gm in the presence of about 1,000 ppm barium.

Example 3

E-1 brine was spiked with 11,600 ppm Ba (as $BaCl_2$) and the isotherm was measured as shown in Table 4. This example shows that the resin capacity for radium decreased even more significantly to about 70 pCi/L in the presence of 11,600 ppm barium.

TABLE 4

Liquid Scintillation Counting Results: Brine Spike-2

| Sample | Resin (g) | Brine (g) | Count/min | Sample-Blank Count/min | Total Activity (pCi/L) | Removable Activity in solution (pCi/L) | Conc on Resin (pCi/g) |
|---|---|---|---|---|---|---|---|
| Blank | | | 34.2 | 0 | | | |
| Spike-2-1 | 0 | 18.158 | 92.58 | 41.4 | 10372 | 3414 | |
| Spike-2-2 | 0.103 | 18.117 | 88.52 | 39.6 | 9917 | 2959 | 69 |
| Spike-2-3 | 0.196 | 18.091 | 86.88 | 38.8 | 9733 | 2776 | 51 |
| Spike-2-4 | 0.395 | 18.016 | 87.9 | 39.3 | 9848 | 2890 | 21 |
| Spike-2-5 | 0.601 | 18.136 | 82.75 | 37.0 | 9271 | 2313 | 29 |
| Spike-2-6 | 0.789 | 18.141 | 77.48 | 34.6 | 8680 | 1722 | 34 |
| Spike-2-7 | 0.202 | 18.044 | 87.87 | 39.3 | 9844 | 2886 | 41 |

Example 4

A laboratory column loaded with 8.36 gm dry DOWEX RSC resin was set up to continuously remove radium from frac water. The column was flushed with deionized water followed by hydrofracturing flowback water sample having a composition identical to that of the E-1 brine.

The column was fed with the hydrofracturing flowback water sample at a rate of 0.6 mL/min. The column and feed were maintained at ambient temperature (25° C.). The column effluent was sampled approximately every 50 to 100 mL, and each sample was analyzed by liquid scintillation counting to determine the activity of radium and daughter products. The measure of column performance is the fraction of the feed activity remaining in the effluent, FFR, as shown in equation [1]. Complete removal of activity from the feed corresponds to a FFR value of 0; no removal of activity from the feed corresponds to a FFR value of 1.

$$FFR = \left( \frac{cpm_{effluent} - cpm_{background}}{cpm_{feed} - cpm_{background}} \right) \quad [1]$$

The FFR for the first 36 effluent samples was 0.026±0.015, which is comparable to the noise level in the LSC measurement. Sample 36 was taken just as a total of 2.0 liters of feed brine had passed through the column. After the first 2.0 liters of feed, the FFR significantly increased, as shown in Table 5.

TABLE 5

Column Breakthrough Results

| Cumulative flow through column, liters | Effluent FFR |
|---|---|
| 2.0 | 0.036 |
| 2.6 | 0.089 |
| 2.9 | 0.16 |
| 3.5 | 0.20 |

This example shows that the DOWEX RSC resin is effective for continuous removal of radium activity from hydrofracturing water with composition E-1.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for treating low barium frac water, said method comprising
   contacting a frac water stream with a radium selective complexing resin to produce a low radium stream;
   passing the low radium stream through a thermal brine concentrator to produce a concentrated brine; and
   passing the concentrated brine through a thermal crystallizer to yield solid sodium chloride.

2. A method according to claim 1, wherein the low barium frac water comprises less than 1,000 ppm barium.

3. A method according to claim 1, wherein the low barium frac water comprises less than 100 ppm barium.

4. A method according to claim 1, additionally comprising pretreating the frac water stream to remove iron and manganese prior to contacting with the radium selective complexing resin.

5. A method according to claim 4, wherein the pretreating the frac water stream to remove iron and manganese comprises
   contacting the frac water stream with with lime and air; and
   precipitating iron and manganese in a clarifier.

6. A method according to claim 1, wherein the frac water stream is filtered prior to contacting with the radium selective complexing resin.

7. A method according to claim 1, additionally comprising contacting the low radium stream with a source of sulfate ion, prior to passing the low radium stream through the thermal brine concentrator.

8. A method according to claim 1, additionally comprising washing the sodium chloride yielded by the thermal crystallizer.

9. A method according to claim 8, the sodium chloride meets government standards for use as road salt after washing.

10. A method for treating low barium frac water, said method comprising
    pretreating a frac water stream to remove iron and manganese;

contacting the pretreated frac water stream with a radium selective complexing resin to produce a low radium stream;
contacting the low radium stream with a source of sulfate ion;
passing the low radium stream through a thermal brine concentrator to produce a concentrated brine; and
passing the concentrated brine through a thermal crystallizer to yield road salt.

11. A method according to claim 10, wherein the low barium frac water comprises less than 1,000 ppm barium.

12. A method according to claim 10, wherein the low barium frac water comprises less than 100 ppm barium.

* * * * *